US012771240B2

(12) United States Patent
Wang et al.

(10) Patent No.: US 12,771,240 B2
(45) Date of Patent: Oct. 20, 2026

(54) INRUSH CURRENT PROTECTION FOR BRIDGELESS TOTEM POLE POWER FACTOR CIRCUIT

(71) Applicant: DELL PRODUCTS L.P., Round Rock, TX (US)

(72) Inventors: Shih-Chieh Wang, New Taipei City (TW); YiChe Hsu, Taipei (TW); Dennis Alinea Martin, New Taipei City (TW)

(73) Assignee: Dell Products L.P., Round Rock, TX (US)

( * ) Notice: Subject to any disclaimer, the term of this patent is extended or adjusted under 35 U.S.C. 154(b) by 242 days.

(21) Appl. No.: 18/650,545

(22) Filed: Apr. 30, 2024

(65) Prior Publication Data

US 2025/0337319 A1 Oct. 30, 2025

(51) Int. Cl.

*H02M 1/42* (2007.01)
*H02M 1/00* (2007.01)
*H02M 1/32* (2007.01)
*H02M 7/217* (2006.01)

(52) U.S. Cl.

CPC ....... *H02M 1/4225* (2013.01); *H02M 1/0009* (2021.05); *H02M 1/32* (2013.01); *H02M 7/217* (2013.01)

(58) Field of Classification Search

CPC ........ H02M 1/32; H02M 1/36; H02M 1/4225; H02M 1/4258; H02M 1/425; H02M 1/4291; H02M 7/217; Y02B 70/10

See application file for complete search history.

(56) References Cited

U.S. PATENT DOCUMENTS

| | | | | |
|---|---|---|---|---|
| 6,091,616 | A * | 7/2000 | Jacobs | H02M 3/33592 363/80 |
| 8,705,254 | B2 * | 4/2014 | Tan | H02M 1/42 363/69 |
| 8,891,261 | B2 * | 11/2014 | Jang | H02M 7/217 363/44 |
| 10,116,234 | B2 | 10/2018 | Raboni et al. | |
| 11,695,329 | B2 * | 7/2023 | Pevere | H02M 1/4225 363/13 |
| 12,176,805 | B2 * | 12/2024 | Afridi | H02M 1/4233 |
| 2018/0278181 | A1 * | 9/2018 | Afridi | H02M 1/4233 |
| 2024/0006988 | A1 | 1/2024 | Dong et al. | |

* cited by examiner

*Primary Examiner* — Crystal L Hammond
*Assistant Examiner* — Nicolas Alden Chapa Mills
(74) *Attorney, Agent, or Firm* — Larson Newman, LLP

(57) ABSTRACT

A power converter includes a capacitor, and first, second, and third legs coupled in parallel with the capacitor. The power converter further includes a flyback transformer having a first inductor and a second inductor, and a buck stage coupled in series between a first terminal of a power source and a first terminal of the first inductor. A second terminal of the first inductor is coupled between the first and second switching elements of the first leg. A first terminal of the second inductor is coupled between third and fourth switching elements of the second leg and to a second terminal of the power source. A second terminal of the second inductor is coupled between fifth and sixth switching elements of the third leg.

16 Claims, 6 Drawing Sheets

100

(Positive Cycle/
Isense < Ipeak)

(Positive Cycle/
Isense ≥ Ipeak)

(Negative Cycle/
Isense < Ipeak)

(Negative Cycle/ Isense ≥ Ipeak)

INRUSH CURRENT PROTECTION FOR BRIDGELESS TOTEM POLE POWER FACTOR CIRCUIT

FIELD OF THE DISCLOSURE

This disclosure generally relates to information handling systems, and more particularly relates to providing inrush current protection for a bridgeless totem pole power factor circuit in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A power converter may include a capacitor, and first, second, and third legs coupled in parallel with the capacitor. The power converter may further include a flyback transformer having a first inductor and a second inductor, and a buck stage coupled in series between a first terminal of a power source and a first terminal of the first inductor. A second terminal of the first inductor may be coupled between the first and second switching elements of the first leg. A first terminal of the second inductor may be coupled between third and fourth switching elements of the second leg and to a second terminal of the power source. A second terminal of the second inductor may be coupled between fifth and sixth switching elements of the third leg.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
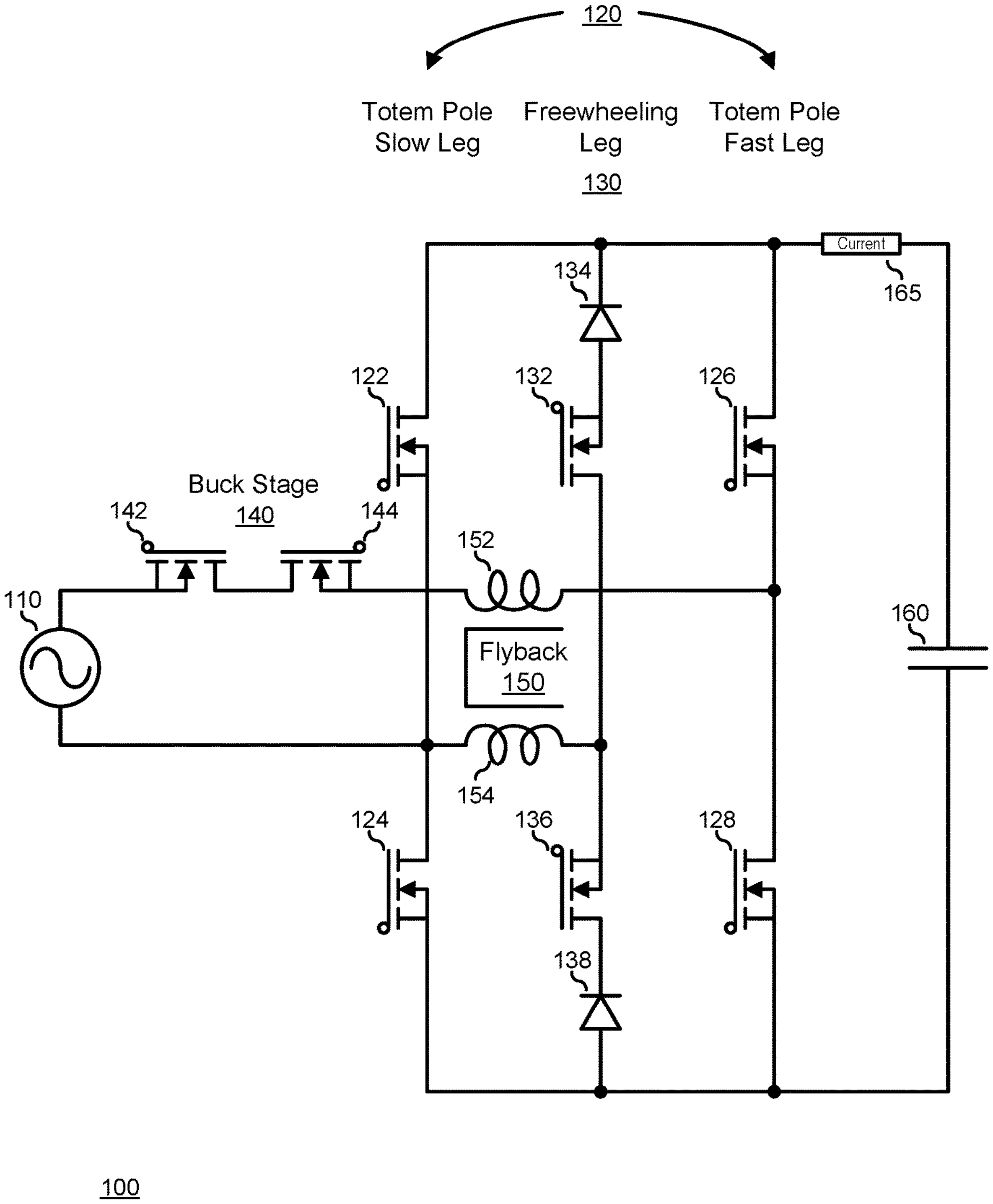
FIG. 1 is a circuit diagram illustrating a totem pole power factor correction power converter according to an embodiment of the present disclosure.

FIG. 1 illustrates a totem pole power factor correction power converter 100. Power converter 100 includes an alternating current (AC) power source 110, a bridgeless totem pole rectifier 120 with a fast leg and a slow leg, a freewheeling leg 130, a buck stage 140, a flyback transformer 150, a bulk capacitor 160, and a current sensor 165. The slow leg of totem pole rectifier 120 includes switching elements 122 and 124, and the fast leg includes switching elements 126 and 128. Freewheeling leg 130 includes switching elements 132 and 136, and diodes 134 and 136. Buck stage 142 includes switching elements 142 and 144. Flyback transformer 150 includes coupled inductors 152 and 154. In a particular embodiment, switching elements 122 and 124 represent silicon MOS FETs whose actions follow the polarity of the input voltage from power source 110. Further, switching elements 126 and 128 represent wide band gap FETs that act as either power factor correction MOS FETs or as power factor correction synchronous rectifiers, depending on the polarity of the input voltage. As such, switching element 126 and 128 may represent Gallium-Arsenide (GaS) MOS FETs, Silicon-Carbide (SIC) MOS FETs, or the like. Switching elements 142 and 144 are back-to-back MOS FETs that act as a series buck switch when charging bulk capacitor 160 when the capacitor voltage is less than the input voltage. Inductors 152 and 154 are coupled windings with a 1:1 ratio. Inductor 152 acts as a boost inductor under normal (that is, non-startup) operations, as described further below. Inductors 152 and 154 act as a flyback transformer during buck operations, and as current source during startup operations, as described further below.

A positive terminal of power source 110 is connected to a source terminal of switching element 142, and a drain terminal of switching element 142 is connected to a drain terminal of switching element 144. A source terminal of switching element 144 is connected to a first terminal of inductor 152. A second terminal of inductor 152 is connected to a source terminal of switching element 126 and to a drain terminal of switching element 128. A negative terminal of power source 110 is connected to a source terminal of switching element 122, to a drain terminal of switching element 124, and to a first terminal of inductor 154. A drain terminal of switching element 122 is connected to a cathode terminal of diode 134, to a drain terminal of switching element 126, and to a first terminal of current sensor 165. A second terminal of current sensor 165 is connected to a first terminal of bulk capacitor 160. A source terminal of switching element 124 is connected to an anode terminal of diode 138, to a source terminal of switching element 128, and to a second terminal of bulk capacitor 160. A second terminal of inductor 154 is connected to a drain terminal of switching element 132 and to a source terminal of switching element 236. A source terminal of switching element 132 is connected to an anode terminal of diode 134. A drain terminal of switching element 136 is connected to a cathode terminal of diode 138.

During normal operation, that is after a startup phase, when the input voltage (VIN) is less than or equal to the voltage on bulk capacitor 160 (Vbulk), that is when:

$$VIN \leq Vbulk \quad \text{Equation 1}$$

power converter 100 operates as a typical totem pole power factor correction power converter to maintain the charge on the bulk capacitor and to provide power to a load. Switching elements 142 and 144 are switched ON and switching elements 132 and 136 are switched OFF. Such normal operation is not specifically illustrated herein, but it will be understood that, when VIN is in a positive portion of the AC cycle, an energy storage operation will operate with switching elements 122 and 126 switched OFF and with switching elements 124 and 128 switched ON, and a boost action operation will operate with switching elements 122 and 128 switched OFF and with switching elements 124 and 126 switched ON.

Similarly when VIN is in a negative portion of the AC cycle, an energy storage operation will operate with switching elements 122 and 126 switched ON and with switching elements 124 and 128 switched OFF, and a boost action operation will operate with switching elements 122 and 128 switched ON and with switching elements 124 and 126 switched OFF. In either case, during the energy storage operation, current is built and energy is stored in inductor 152, and during the boost action operation the stored energy is provided to maintain the voltage level on bulk capacitor 160. The non-startup operation of totem pole power factor correction power converters are known in the art and will not be further described herein, except as may be needed to illustrate the current embodiments.

It has been understood by the inventors of the current embodiments that, during the startup phase of operation of totem pole power factor correction power converters, large inrush currents are experienced due to the need to first charge the bulk capacitor. It is further noted that, even with the switching elements switched OFF, the topography of totem pole power factor correction power converters provides circuit paths between the power source and the output. In particular, the body diodes of the switching elements may be sufficiently forward biased to permit large inrush currents. Moreover, during input voltage dropouts, the bulk voltage also drops and a re-rush current is encountered when the input voltage becomes higher than the bulk voltage.

In a particular embodiment, power converter 100 operates as a current source during the charging of bulk capacitor 160, operating to limit the inrush currents to at or below a predetermine peak current (Ipeak). The inrush current is measured by current sensor 165. Thus, by altering the switching behavior of the switching elements based on the detected current (Isense), power converter 100 maintains the inrush current at or below the peak current (Ipeak). FIGS. 2-5 illustrate the operation of power converter 100 to limit the detected current (Isense) during the startup phase of operation.

Figure 2:
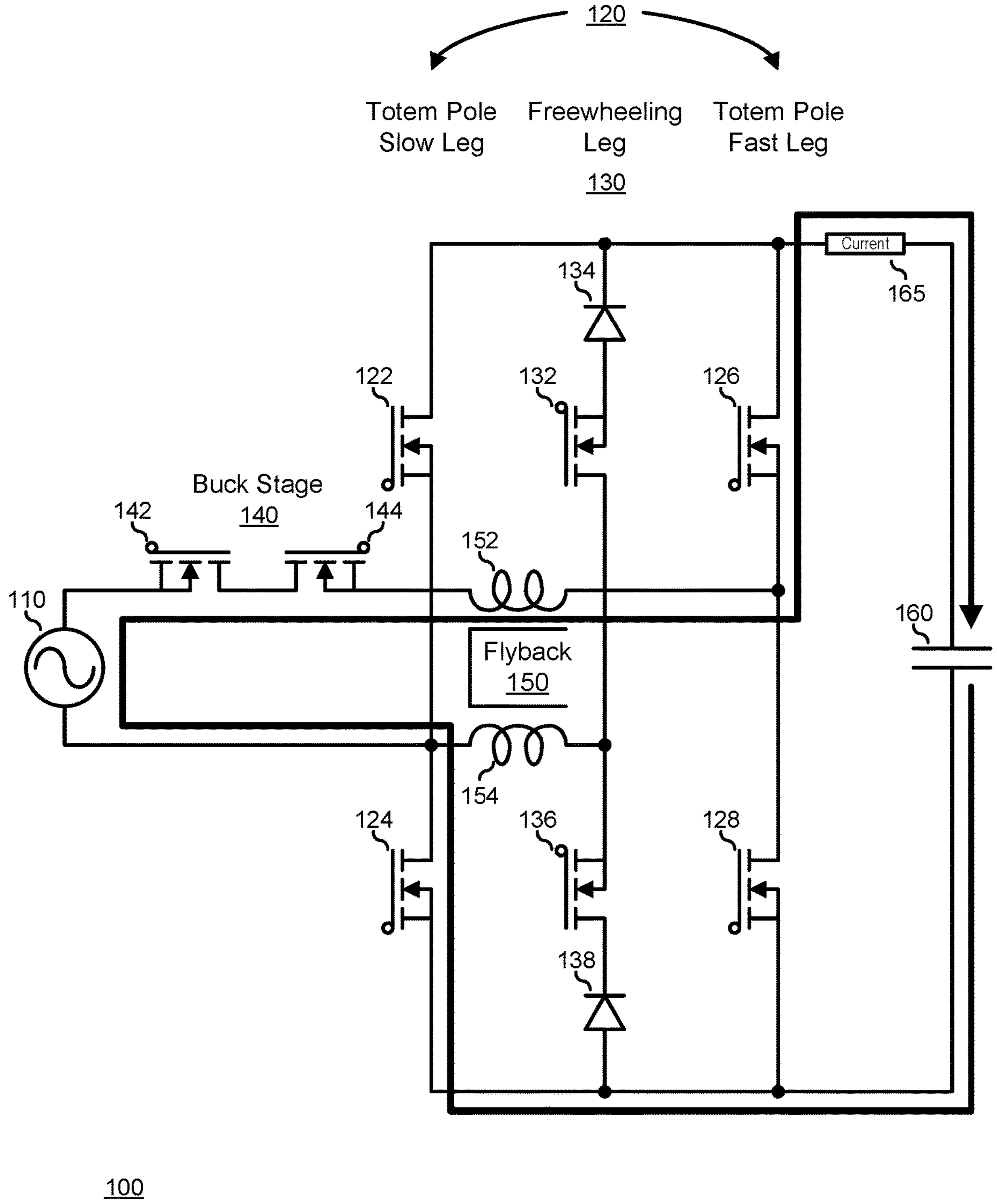
FIGS. 2-5 illustrate operations of the totem pole power factor correction power converter of FIG. 1.

FIG. 2 illustrates the operation of power converter 100 during a positive portion of the AC cycle when the detected current (Isense) is less than the peak current (Ipeak), that is, when:

$$Isense < Ipeak. \quad \text{Equation 2}$$

Here, switching elements 124, 126, 142 and 144 are switched ON, and switching elements 122, 128, 132, and 136 are switched OFF. As such a charging current is provided to bulk capacitor 160 that flows from a negative terminal of the bulk capacitor, through switching element 124, power source 110, switching elements 142 and 144, inductor 152, switching element 126, and current sensor 165 to the positive terminal of the bulk capacitor. This charging current operates to build current and store energy in inductor 152. Inductor 152 is one half of flyback transformer 150, and so the current induced in inductor 152 is induced into inductor 154.

Figure 3:
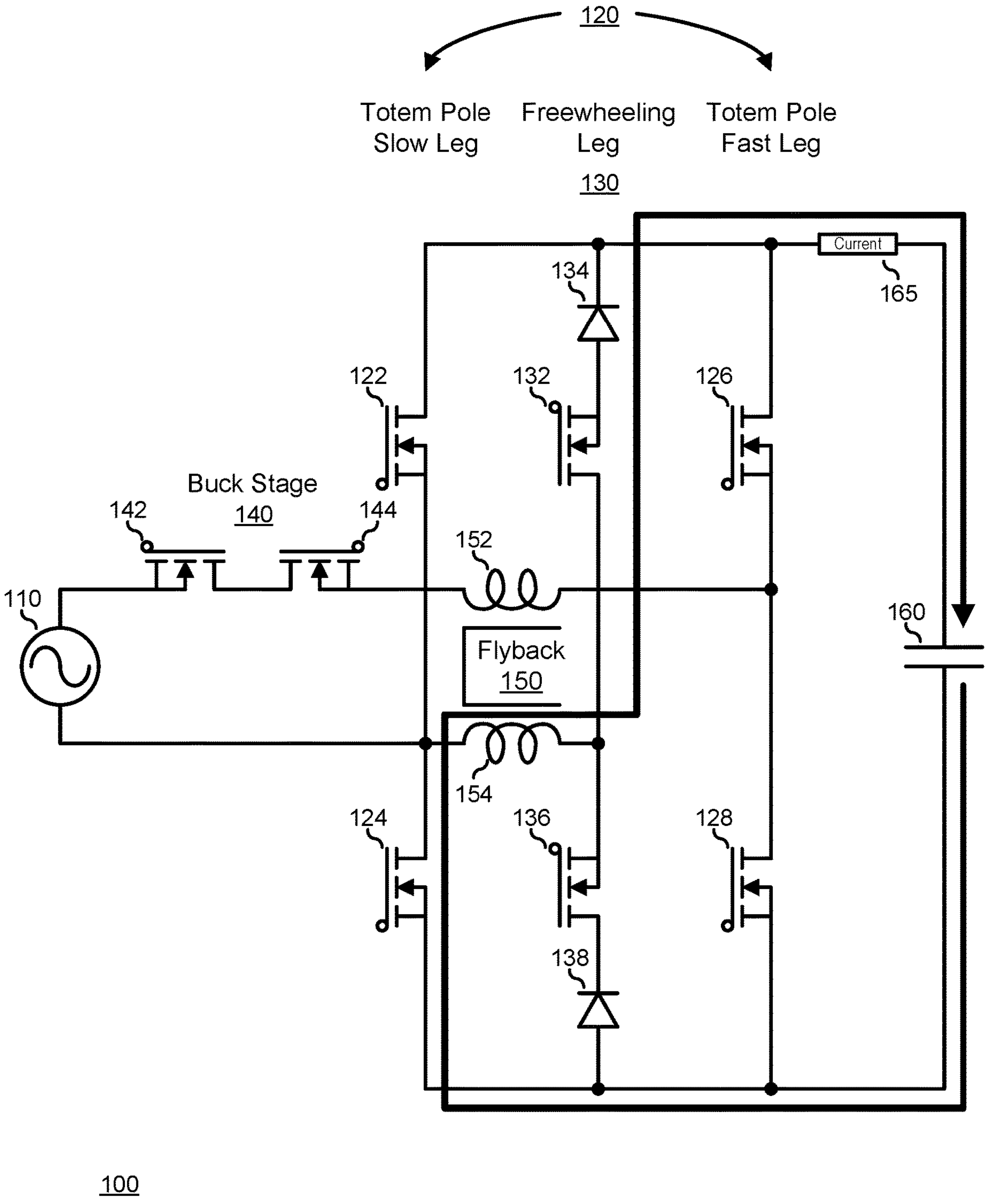

FIG. 3 illustrates the operation of power converter 100 during a positive portion of the AC cycle when the detected current (Isense) is greater than or equal to the peak current (Ipeak), that is when:

$$Isense \geq Ipeak. \quad \text{Equation 3}$$

Here, switching elements 124 and 132 are switched on and switching elements 122, 126, 128, 136, 142 and 144 are switched OFF. As such, a charging current is maintained to bulk capacitor 160 that flows from the negative terminal of the bulk capacitor, through switching element 124, inductor 154, switching element 132, and current sensor 165 to the positive terminal of the bulk capacitor. This charging current is sourced by the induced current in inductor 154.

Figure 4:
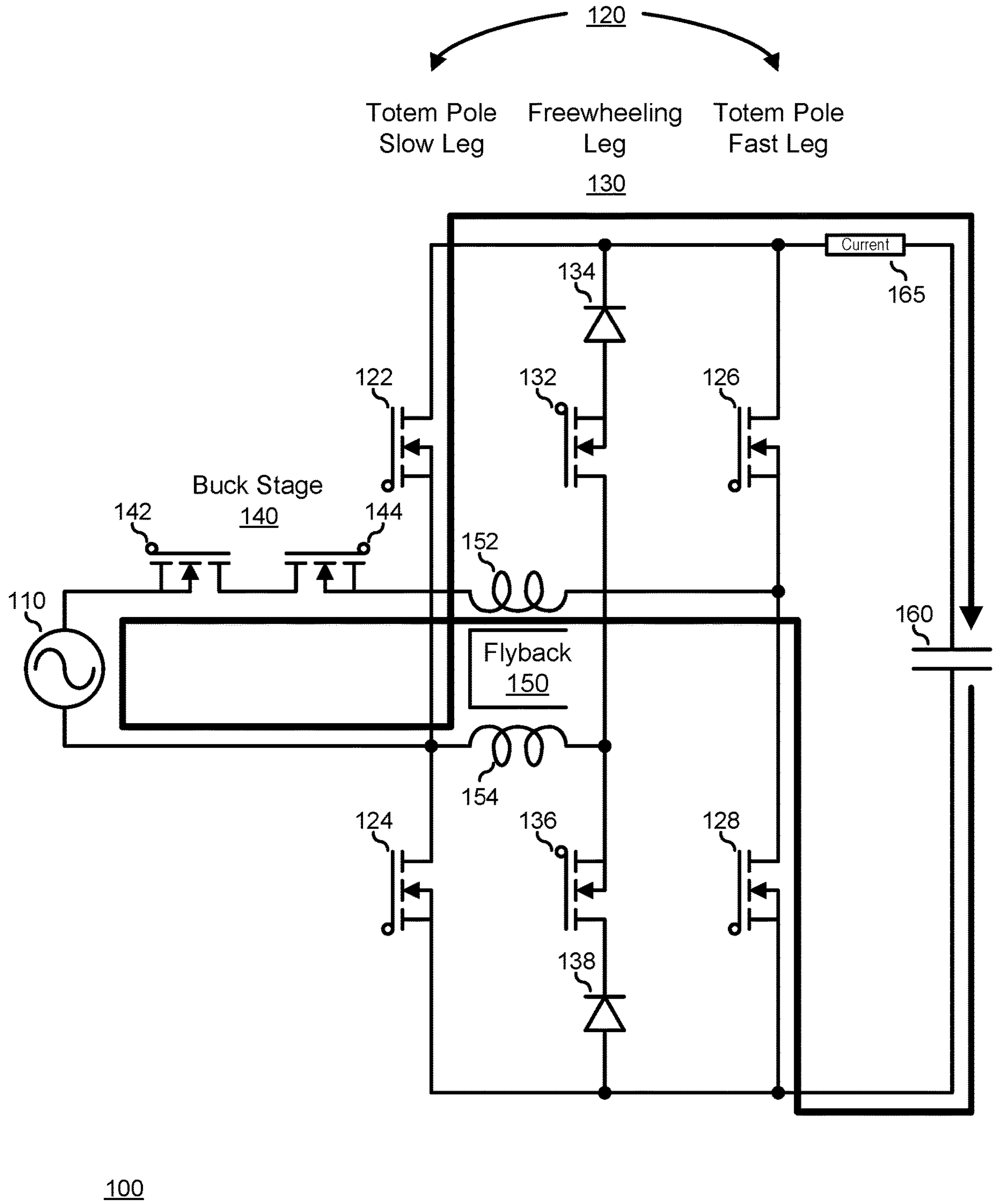

FIG. 4 illustrates the operation of power converter 100 during a negative portion of the AC cycle when the detected current (Isense) is less than the peak current (Ipeak), as described in Equation 2, above. Here switching elements 122, 128, 142 and 144 are switched ON, and switching elements 124, 126, 132, and 136 are switched OFF. As such a charging current is provided to bulk capacitor 160 that flows from the negative terminal of the bulk capacitor, through switching element 128, inductor 152, switching elements 142 and 144, power source 110, switching element 122, and current sensor 165 to the positive terminal of the bulk capacitor. This charging current operates to build current and store energy in inductor 152, and said current is induced into inductor 154.

Figure 5:
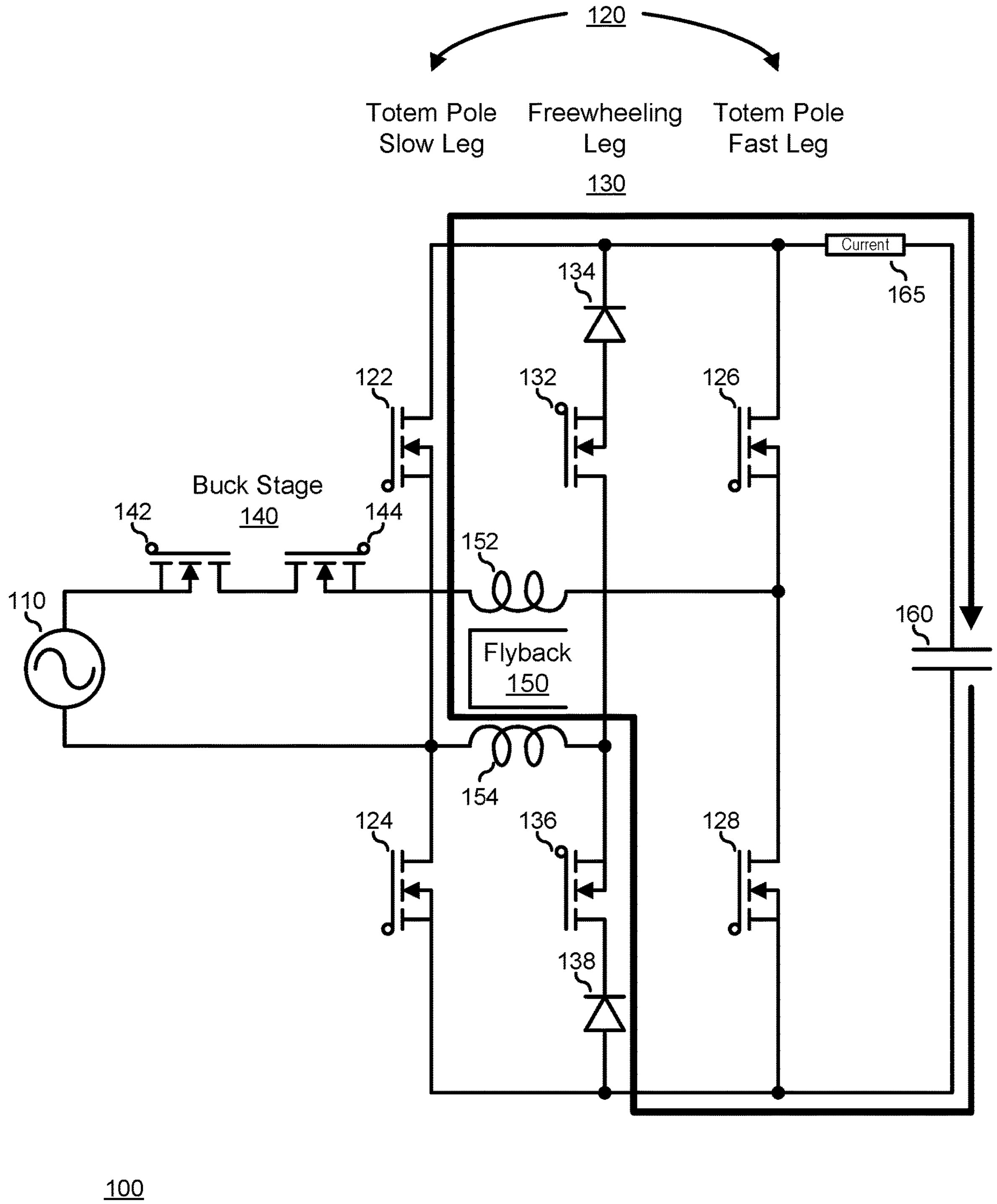

FIG. 5 illustrates the operation of power converter 100 during a negative portion of the AC cycle when the detected current (Isense) is greater than or equal to the peak current (Ipeak), as described in Equation 3, above. Switching elements 122 and 136 are switched ON and switching elements 124, 126, 128, 132, 142 and 144 are switched OFF. As such a charging current is maintained to bulk capacitor 160 that flows from the negative terminal of the bulk capacitor, through switching element 136, inductor 154, switching element 122, and current sensor 165 to the positive terminal of the bulk capacitor. This charging current is sourced by the induced current in inductor 154.

Figure 6:
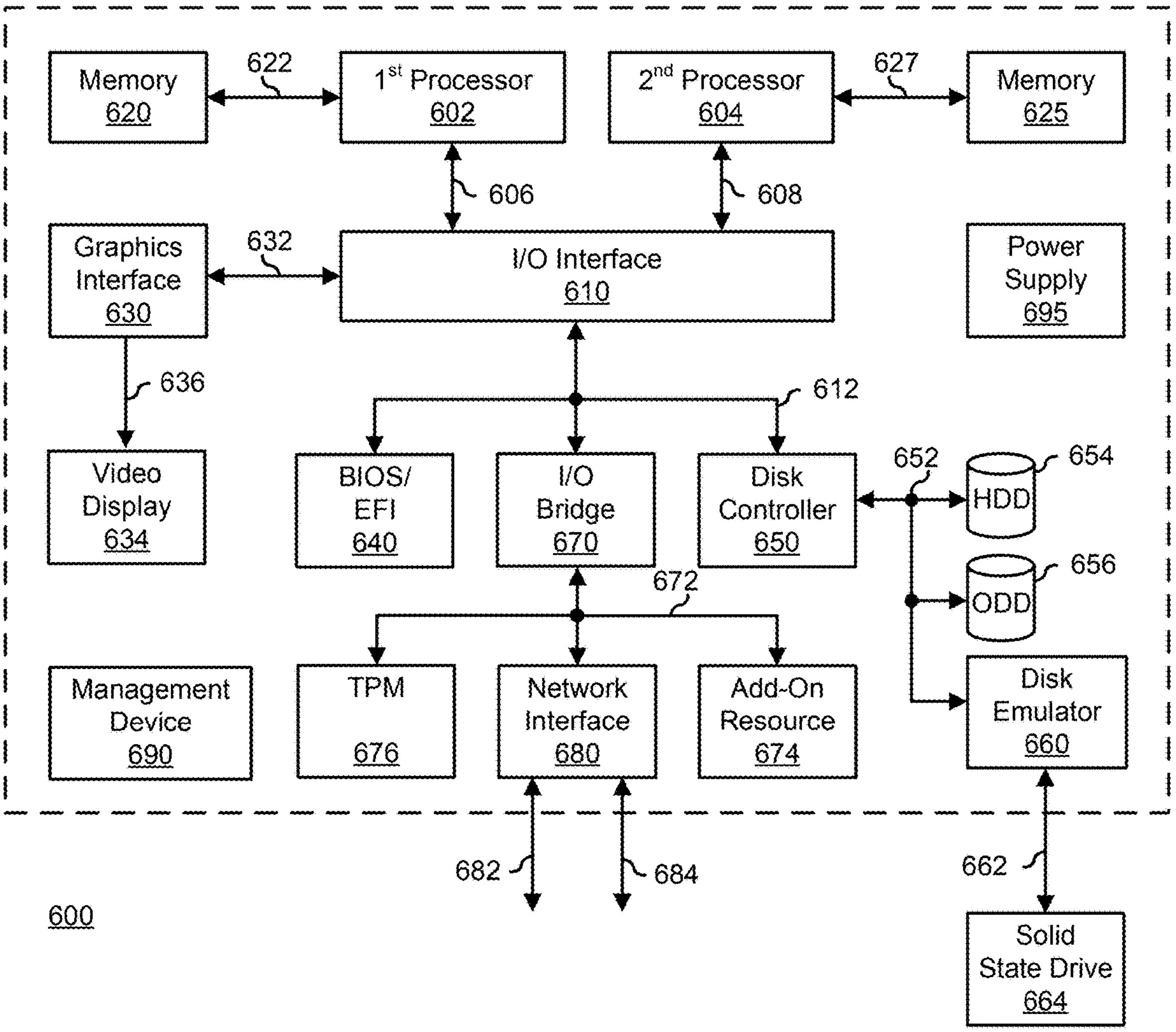
FIG. 6 is a block diagram illustrating a generalized information handling system according to another embodiment of the present disclosure.

FIG. 6 illustrates a generalized embodiment of an information handling system 600 similar to information handling system 600. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described below, and operates to perform one or more of the methods described below. Information handling system 600 includes a processors 602 and 604, an input/output (I/O) interface 610, memories 620 and 625, a graphics interface 630, a basic input and output system/universal extensible firmware interface (BIOS/UEFI) module 640, a disk controller 650, a hard disk drive (HDD) 654, an optical disk drive (ODD) 656, a disk emulator 660 connected to an external solid state drive (SSD) 662, an I/O bridge 670, one or more add-on resources 674, a trusted platform module (TPM) 676, a network interface 680, a management device 690, and a power supply 695. Processors 602 and 604, I/O interface 610, memory 620, graphics interface 630, BIOS/UEFI module 640, disk controller 650, HDD 654, ODD 656, disk emulator 660, SSD 662, I/O bridge 670, add-on resources 674, TPM 676, and network interface 680 operate together to provide a host environment of information handling system 600 that operates to provide the data processing functionality of the information handling system. The host environment operates to execute machine-executable code, including platform BIOS/UEFI code, device firmware, operating system code, applications, programs, and the like, to perform the data processing tasks associated with information handling system 600.

In the host environment, processor 602 is connected to I/O interface 610 via processor interface 606, and processor 604 is connected to the I/O interface via processor interface 608. Memory 620 is connected to processor 602 via a memory interface 622. Memory 625 is connected to processor 604 via a memory interface 627. Graphics interface 630 is connected to I/O interface 610 via a graphics interface 632, and provides a video display output 636 to a video display 634. In a particular embodiment, information handling system 600 includes separate memories that are dedicated to each of processors 602 and 604 via separate memory interfaces. An example of memories 620 and 630 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 640, disk controller 650, and I/O bridge 670 are connected to I/O interface 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 610 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/UEFI module 640 includes BIOS/UEFI code operable to detect resources within information handling system 600, to provide drivers for the resources, initialize the resources, and access the resources. BIOS/UEFI module 640 includes code that operates to detect resources within information handling system 600, to provide drivers for the resources, to initialize the resources, and to access the resources.

Disk controller 650 includes a disk interface 652 that connects the disk controller to HDD 654, to ODD 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits SSD 664 to be connected to information handling system 600 via an external interface 662. An example of external interface 662 includes a USB interface, an IEEE 1394 (Firewire) interface, a proprietary interface, or a combination thereof. Alternatively, solid-state drive 664 can be disposed within information handling system 600.

I/O bridge 670 includes a peripheral interface 672 that connects the I/O bridge to add-on resource 674, to TPM 676, and to network interface 680. Peripheral interface 672 can be the same type of interface as I/O channel 612, or can be a different type of interface. As such, I/O bridge 670 extends the capacity of I/O channel 612 where peripheral interface 672 and the I/O channel are of the same type, and the I/O bridge translates information from a format suitable to the I/O channel to a format suitable to the peripheral channel 672 where they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as I/O interface 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Management device 690 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 600. In particular, management device 690 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 600, such as system cooling fans and power supplies. Management device 690 can include a network connection to an external management system, and the management device can communicate with the management system to report status information for information handling system 600, to receive BIOS/UEFI or system firmware updates, or to perform other task for managing and controlling the operation of information handling system 600. Management device 690 can operate off of a separate power plane from the components of the host environment so that the management device receives power to manage information handling system 600 where the information handling system is otherwise shut down. An example of management device 690 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 690 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A power converter configured as a totem pole power factor correction power converter, the power converter comprising:

a capacitor;

a first leg coupled in parallel with the capacitor, the first leg including a first switching element coupled in series with a second switching element;

a second leg coupled in parallel with the capacitor, the second leg including a third switching element coupled in series with a fourth switching element;

a third leg coupled in parallel with the capacitor, the third leg including a fifth switching element coupled in series with a sixth switching element;

a flyback transformer having a first inductor and a second inductor;

a buck stage coupled in series between a first terminal of a power source and a first terminal of the first inductor, the buck stage including a seventh switching element coupled in series with an eighth switching element; and a current sensor configured to detect a current into the capacitor, wherein a second terminal of the first inductor is coupled between the first and second switching elements, a first terminal of the second inductor is coupled between the third and fourth switching elements and to a second terminal of the power source, and a second terminal of the second inductor is coupled between the fifth and sixth switching elements, and wherein when a capacitor current level detected by the current sensor is less than a predetermined threshold, the seventh and eighth switching elements are turned ON.

2. The power converter of claim 1, wherein the power converter is configured to determine whether the capacitor current level is less than or greater than or equal to the predetermined current level.

3. The power converter of claim 1, wherein further, when the capacitor current level is less than the predetermined current level, the first and second legs operate to couple current from the power source to provide a voltage on the capacitor.

4. The power converter of claim 3, wherein, when the capacitor current level is greater than to equal to the predetermined current level, the seventh and eighth switching elements are turned OFF.

5. The power converter of claim 4, wherein further, when the capacitor current level is greater than to equal to the predetermined current level, a current in the second inductor is coupled to provide a charging current to the capacitor.

6. The power converter of claim 5, wherein the power source is an alternating current power source.

7. The power converter of claim 6, wherein, when the current in the second inductor is coupled to provide the charging current, and when the power source is in a positive portion of a power cycle, the fourth and fifth switching elements are ON and all other switching elements are OFF.

8. The power converter of claim 6, wherein, when the current in the second inductor is coupled to provide the charging current, and when the power source is in a negative portion of a power cycle, the third and sixth switching elements are ON and all other switching elements are OFF.

9. A method for providing a power converter configured as a totem pole power factor correction power converter, the method comprising:

coupling a first leg in parallel with a capacitor, the first leg including a first switching element coupled in series with a second switching element;

coupling a second leg in parallel with the capacitor, the second leg including a third switching element coupled in series with a fourth switching element;

coupling a third leg in parallel with the capacitor, the third leg including a fifth switching element coupled in series with a sixth switching element;

providing a flyback transformer having a first inductor and a second inductor;

providing a buck stage coupled in series between a first terminal of a power source and a first terminal of the first inductor, the buck stage including a seventh switching element coupled in series with an eighth switching element;

coupling a second terminal of the first inductor between the first and second switching elements;

coupling a first terminal of the second inductor between the third and fourth switching elements and to a second terminal of the power source;

coupling a second terminal of the second inductor between the fifth and sixth switching elements;

providing a current sensor configured to detect a current into the capacitor; and when a capacitor current level detected by the current sensor is less than a predetermined threshold, turning the seventh and eighth switching elements ON.

10. The method of claim 9, further comprising determining, by the power converter, whether the capacitor current level detected by the current sensor is less than or greater than or equal to the predetermined current level.

11. The method of claim 9, wherein when the capacitor current level is less than the predetermined current level, the first and second legs operate to couple current from the power source to provide a voltage on the capacitor.

12. The method of claim 11, wherein when the capacitor current level is greater than to equal to the predetermined current level, the seventh and eighth switching elements are turned OFF.

13. The method of claim 12, wherein when the capacitor current level is greater than to equal to the predetermined current level, a current in the second inductor is coupled to provide a charging current to the capacitor.

14. The method of claim 13, wherein the power source is an alternating current power source.

15. The method of claim 14, wherein:

when the current in the second inductor is coupled to provide the charging current, and when the power source is in a positive portion of a power cycle, the fourth and fifth switching elements are ON and all other switching elements are OFF; and when the current in the second inductor is coupled to provide the charging current, and when the power source is in a negative portion of a power cycle, the third and sixth switching elements are ON and all other switching elements are OFF.

16. A power converter configured as a totem pole power factor correction power converter, the power converter comprising:

a first leg coupled in parallel with a capacitor, the first leg including a first switching element coupled in series with a second switching element, wherein the first and second switching elements are one of a Gallium-Arsenide MOS FET or a Silicon-Carbide MOS FET;

a second leg coupled in parallel with the capacitor, the second leg including a third switching element coupled in series with a fourth switching element;

a third leg coupled in parallel with the capacitor, the third leg including a fifth switching element coupled in series with a sixth switching element a flyback transformer having a first inductor and a second inductor;

a buck stage coupled in series between a first terminal of a power source and a first terminal of the first inductor, the buck stage including a seventh switching element coupled in series with an eighth switching element; and a current sensor configured to detect a current into the capacitor, wherein a second terminal of the first inductor is coupled between the first and second switching elements, a first terminal of the second inductor is coupled between the third and fourth switching elements and to a second terminal of the power source, and a second terminal of the second inductor is coupled between the fifth and sixth switching elements, and wherein when a capacitor current level detected by the current sensor is less than a predetermined threshold, the seventh and eighth switching elements are turned ON.

* * * * *